UNITED STATES PATENT OFFICE.

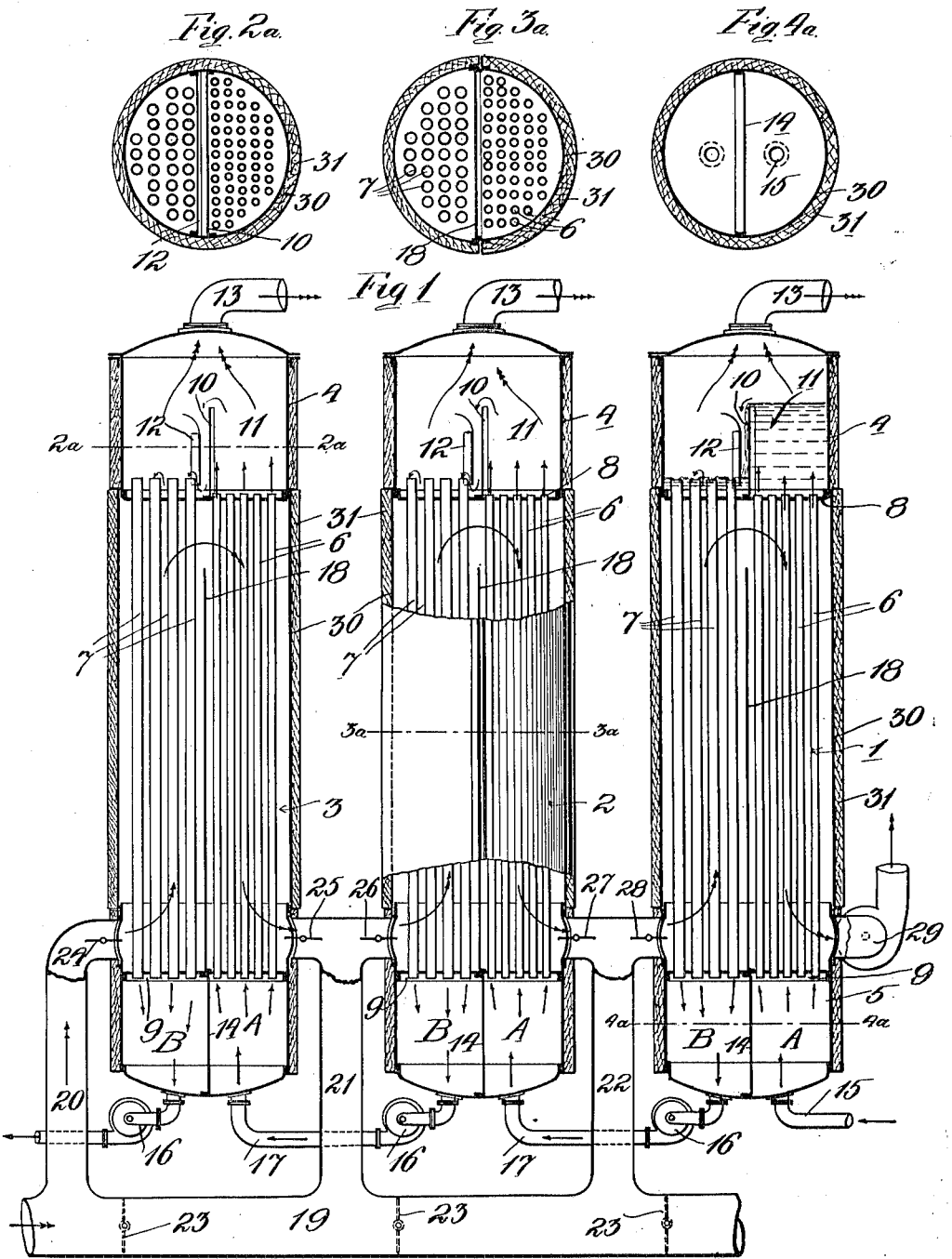

ROY C. DUNDAS, OF LOS ANGELES, CALIFORNIA.

DISTILLING APPARATUS.

1,120,039.

Specification of Letters Patent.

Patented Dec. 8, 1914.

Application filed January 23, 1913. Serial No. 743,871.

*To all whom it may concern:*

Be it known that I, ROY C. DUNDAS, a citizen of the United States, residing at Los Angeles, in the county of Los Angeles and State of California, have invented a certain new and useful Distilling Apparatus, of which the following is a specification.

My invention relates to an apparatus for the distillation of oils, specifically the petroleum oils of California, and has for one of its objects to provide an apparatus in which the oil is distributed over the largest possible area during the vaporizing process, whereby the vapors are free to pass off, as soon as they are liberated from the base, without having to penetrate through a dense and bulky mass, as is the case in cylinder distilling.

Another object of this invention is to provide a still in which a low degree of heat may be used, as compared with the high degree of heat employed in other systems of distillation; in which waste heat may be employed for all purposes of reducing the petroleum to its final base, and in which the heat may be always under control thereby to eliminate all danger of destructive distillation.

The accompanying drawing illustrates a preferred embodiment of the invention.

Figure 1, is a vertical section of the distilling apparatus. Fig. 2ª, is a transverse section on lines 2ª—2ª, Fig. 1. Fig. 3ª, is a transverse section on lines 3ª—3ª, Fig. 1; and Fig. 4ª, is a transverse section on lines 4ª—4ª, Fig. 1.

The distilling apparatus shown in the drawing, comprises three or more stills 1, 2, and 3, each in itself capable of carrying on a complete distillation of a certain quantity of crude oil, and arranged in combination for continuous distillation. Each still consists of two drums 4 and 5, interconnected by two sets of flues 6 and 7, expanded in the flue plates 8 and 9, of the drums 4 and 5, respectively. The flues 7, are of greater diameter than that of the flues 6, for purposes to appear later, and extend for a short distance above the face of the flue plate 8, of the drum 4, said flues 7, being separated from the flues 6, by a wall 10, rising vertically from said flue plate 8, which wall 10, forms substantially a tank 11, to which oil is delivered through the flues 6. In proximity to and spaced from said wall 10, is a plate 12, provided to prevent splashing of the oil as it flows over the wall 10, and to cause it to flow evenly and in thin films through all of the larger flues 7. As seen, the upper edge of said plate 12, is curved away from a vertical plane, in order that none of the oil flowing over the wall 10, may directly enter the larger flues 7. It will be noted that the specific function of this wall 10, is to cause the oil to be thinned out in bulk as it flows thereover, in order that the vapor generated during the passage of the oil upwardly through the flues 6, may freely leave the oil and enter the vapor pipe 13, where, as is obvious, it may be led to a suitable condensing chamber. The drum 4, forms substantially a vapor chamber, the vapors being carried off through the pipe 13, on the top of said drum.

The drum 5, is divided into two compartments A and B, by a partition 14, which also separates the sets of flues 6 and 7. Oil is delivered to the compartment A, through a pipe 15, leading into the bottom of said drum 5, and through the flues 6, to the tank 11, in drum 4, and overflows the tank 11, finally gravitating in thin films through the flues 7, to the compartment B, in the drum 5. By means of a pump 16, the oil in the compartment B, is delivered through a pipe 17, to the compartment A, in the lower drum 5, of the adjacent still 2, and the next still 3, in which the oil follows the same course as in the first still. The two sets of flues 6 and 7 in each still, are separated from each other by a baffle plate 18, which rises to within a short distance of the flue plate 8, whereby different degrees of heat may be obtained in each still. Heat, obtained from any suitable source, may be delivered to a main flue 19, from which it may be led into the stills at a point above the flue plates 9, by suitable laterals 20, 21 and 22, suitable dampers 23, being provided in the main flue 19, to control the passage of heat to one, two or all of the stills. Additional dampers 24, 25, 26, 27 and 28, may be provided in the laterals to govern the passage of the heat from the main flue 19, to each still independently according to need.

Suitable means, such as a suction fan 29, may be provided to induce a draft through the stills, or a forced draft may be used where found more expedient. The flues of each still are incased by a cover or jacket 30, removably applied, in order to gain access to the flues for cleaning or repairing, and this jacket 30, may be furnished with a nonconducting covering 31, to prevent loss of heat through radiation.

The degree of heat used in this apparatus varies in each still and ranges from a maximum in the third still to a minimum in the first still. In this manner alone is ideal distillation possible because at no time is the heat of such a degree as to cause a forced vaporization. On account of the large area afforded by the flues and the comparatively small amount of oil passing through the same, a low degree of heat is possible for effecting a complete and thorough evaporation, and this degree of heat may be stated to safely remain within any limit that will not cause cracking of the oils or destructive distillation in any of the stills, particularly the last or third still, where the increased density of the oil requires a maximum heat. When the still is set in operation, the dampers 23, in the main flue 19, are opened as are also those in the laterals, viz. 24, 25, 26, 27 and 28, and the suction means, where this method of maintaining a draft is used, started. Oil is then forced through the pipe 15, to the compartment A, of the lower drum 5, from which it ascends through the smaller flues 6, meeting in its upward travel a gradually increasing heat, and eventually filling the tank 11, in the upper drum 4. If water be contained in the oil, it is gradually converted into a vaporous condition and is fully vaporized when it reaches the tank 11, from which the water vapors pass off with the oil vapors when the oil is thinned by flowing over the wall 10, as explained. Since the transformation of the water into vapors is slow and concurrent with the liberation of the vapors of the oil, the undesirable and troublesome foaming is obviated. The oil continuously flows over the wall 10, in the upper drum of each still, onto the flue plate 8, then flows over the top of the larger flues and finally gravitates in thin films or layers through said larger flues 7. During the course of such downward flow of the oil evaporation takes place and the liberated vapors are free to escape through the vapor pipe 13. The oil in each still is subjected to varying degrees of heat as is obvious from the drawing, and in consequence of this variation which is steady and uniformly under control, the oil in each still is subjected to a heat which is never destructive and which tends to more speedily and more effectually liberate the vapors.

What I claim, is:—

1. A still comprising a plurality of drums interconnected by two sets of flues of different diameters, the upper drum having a vapor pipe and a wall forming substantially a tank, and the lower drum having a partition dividing it into two compartments and separating the larger from the smaller flues, means to deliver oil into one of the compartments of the lower drums and force it upwardly through the smaller set of flues into said tank in said upper drum and cause it to continuously flow over said wall whereby the oil is thinned and the generated vapors liberated, a deflecting plate in proximity to said wall to prevent the oil from unevenly entering the larger flues, means to supply heat to said flues, and means to regulate the heat.

2. In a vaporizing apparatus for oils, the combination with a heating chamber and means to supply heat to said chamber, of an upper drum and a lower drum forming part of said heating chamber, said lower drum being divided into two chambers, and said upper drum having an oil reservoir, a plurality of oil flues connecting one of the chambers of the lower drum with said reservoir of the upper drum, a plurality of flues of larger diameter than said first named flues connecting the other of said chambers with said upper drum, a baffle plate within said heating chamber separating said larger flues from said smaller flues, and means to force oil upwardly through said smaller flues.

3. In a vaporizing apparatus for oils, the combination with a heating chamber and means to supply heat thereto, of an upper drum and a lower drum forming part of said heating chamber, said lower drum being divided into two chambers, and said upper drum having a wall forming an oil reservoir, and a vapor pipe, a plurality of flues connecting one of the chambers of said lower drum with the reservoir of said upper drum, a plurality of flues of larger diameter than said first named flues connecting the other of said chambers of said lower drum with said upper drum, a deflecting plate in proximity to said wall, and means to force oil upwardly through said smaller flues.

4. In a vaporizing apparatus for oils, comprising a series of unit stills, severally consisting of the combination of a heating chamber, an upper drum and a lower drum forming part of said chamber, said upper drum having a vertical wall therein of a height less than that of said drum and forming a reservoir, and said lower drum being divided into two chambers, a plurality of pipes connecting the reservoir of the upper drum with one of the chambers of the lower drum, a plurality of pipes of larger diameter than said first named pipes connecting the upper drum with the other of said chambers in said lower drum, means to supply oil to said smaller pipes, and means to supply heat to said pipes according to need.

In testimony whereof I affix my signature in the presence of two witnesses.

ROY C. DUNDAS.

Witnesses:
 E. L. STILWELL,
 ANTON GLOETZNER, Jr.